Figure 1:
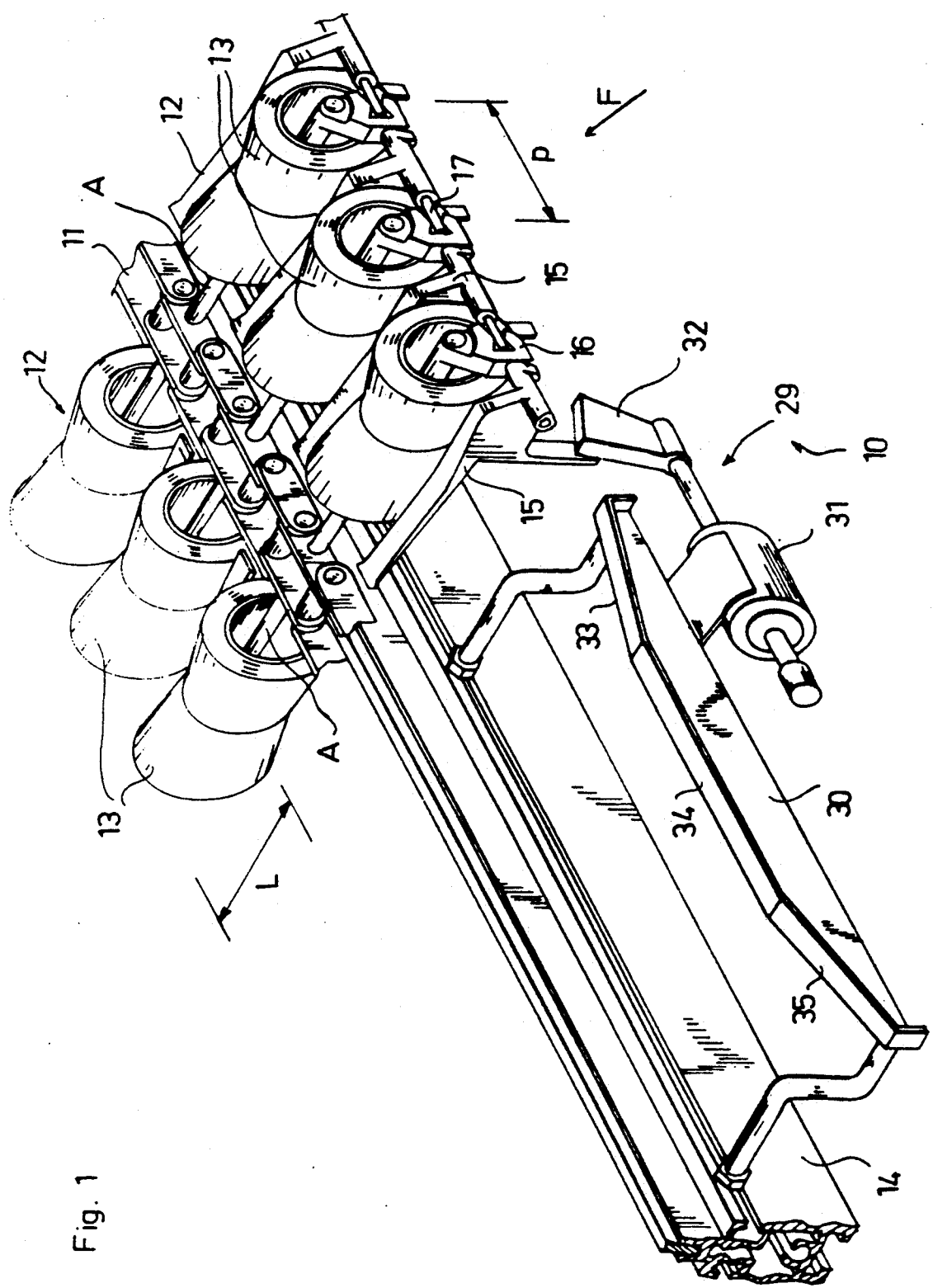

United States Patent [19]

Blanc

[11] Patent Number: 5,280,838
[45] Date of Patent: Jan. 25, 1994

[54] APPARATUS FOR CONVEYING AND SORTING PRODUCE

[76] Inventor: Philippe Blanc, 33, avenue Gambetta, 82000 Montauban, France

[21] Appl. No.: 918,701

[22] Filed: Jul. 27, 1992

[30] Foreign Application Priority Data

Aug. 14, 1991 [FR] France .................. 91 10393

[51] Int. Cl.$^5$ .................................................. B07C 5/00
[52] U.S. Cl. ..................................... 209/552; 209/652; 209/701.1; 209/912; 198/372
[58] Field of Search ............... 209/552, 652, 698, 701, 209/912; 198/365, 370, 372, 482.1

[56] References Cited

U.S. PATENT DOCUMENTS

| | | | |
|---|---|---|---|
| 3,662,874 | 5/1972 | Muller | 198/365 |
| 4,993,535 | 2/1991 | Scata | |
| 5,029,692 | 7/1991 | Warkentin | 209/652 |
| 5,042,637 | 8/1991 | La Vars et al. | 209/652 |
| 5,156,278 | 10/1992 | Aaron et al. | 209/701 |
| 5,174,429 | 12/1992 | La Vars et al. | 209/652 |
| 5,181,596 | 1/1993 | Warkentin | 209/701 |

FOREIGN PATENT DOCUMENTS

| | | |
|---|---|---|
| 0345036 | 6/1989 | European Pat. Off. |
| 415773 | 7/1925 | Fed. Rep. of Germany |
| 2618088 | 1/1989 | France ................. 209/912 |
| 271468 | 9/1989 | German Democratic Rep. .................. 209/912 |
| WO89/08510 | 9/1989 | PCT Int'l Appl. ............ 209/652 |

*Primary Examiner*—Joseph E. Valenza
*Assistant Examiner*—Tuan N. Nguyen
*Attorney, Agent, or Firm*—Breiner & Breiner

[57] ABSTRACT

An apparatus for conveying and sorting produce, in particular fruit, provided with a mechanism to discharge the produce is described. The apparatus includes a pair of conveyor lines located on either side of an endless drive chain. Each conveyor line includes a plurality of rollers. The rollers are spaced apart such that one item of produce can be held between each pair of rollers. The discharge mechanism includes a plurality of ejectors wherein one ejector is located between two rollers, a plurality of pivot axes, and a plurality of linking members designed to connect together the plurality of pivot axes while allowing the axes to mutually move angularly and longitudinally. This apparatus is especially suited to sorting fruits according to their quality.

14 Claims, 5 Drawing Sheets

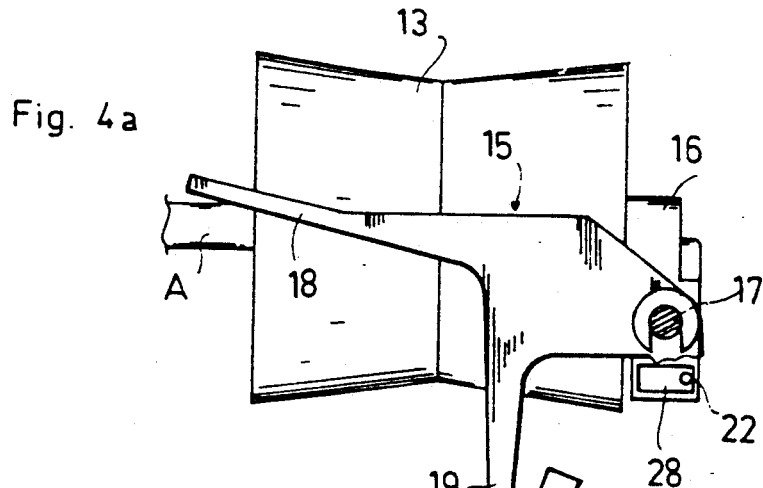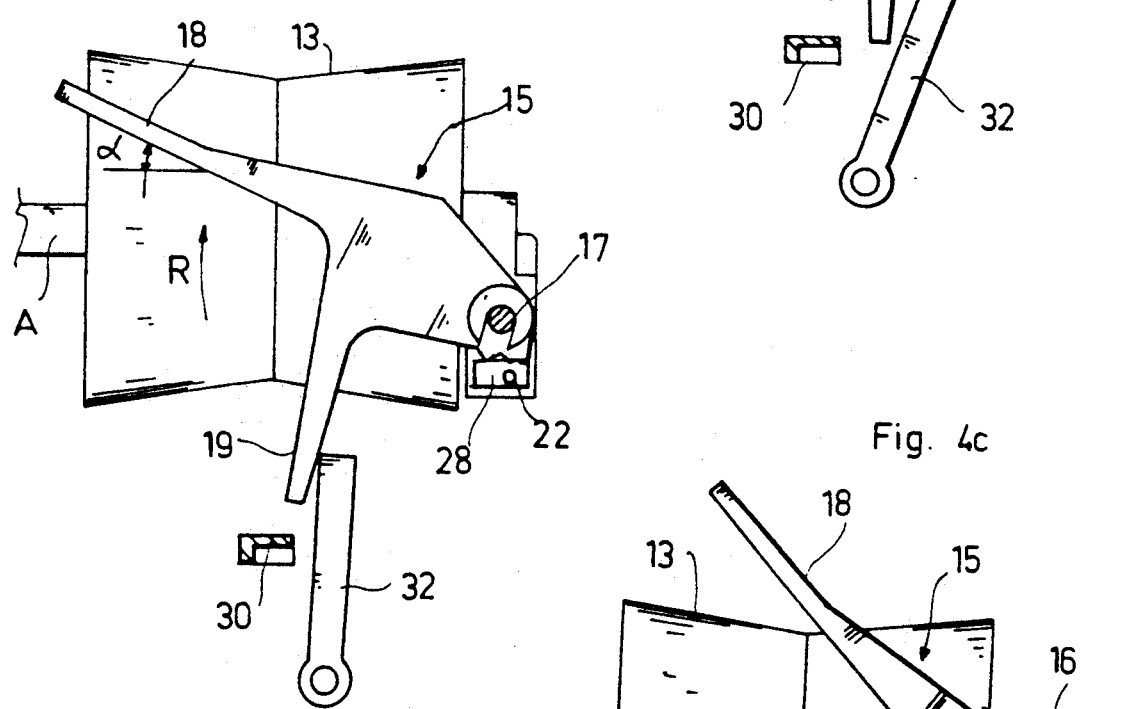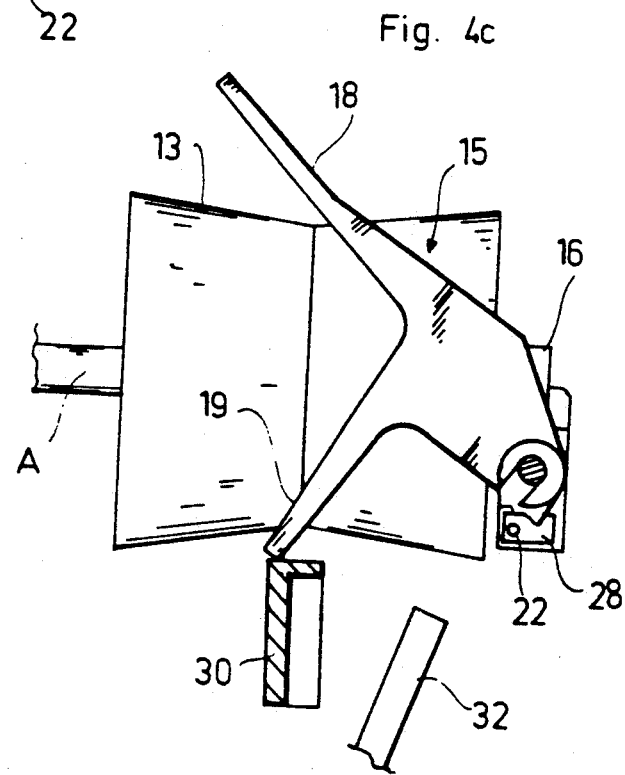

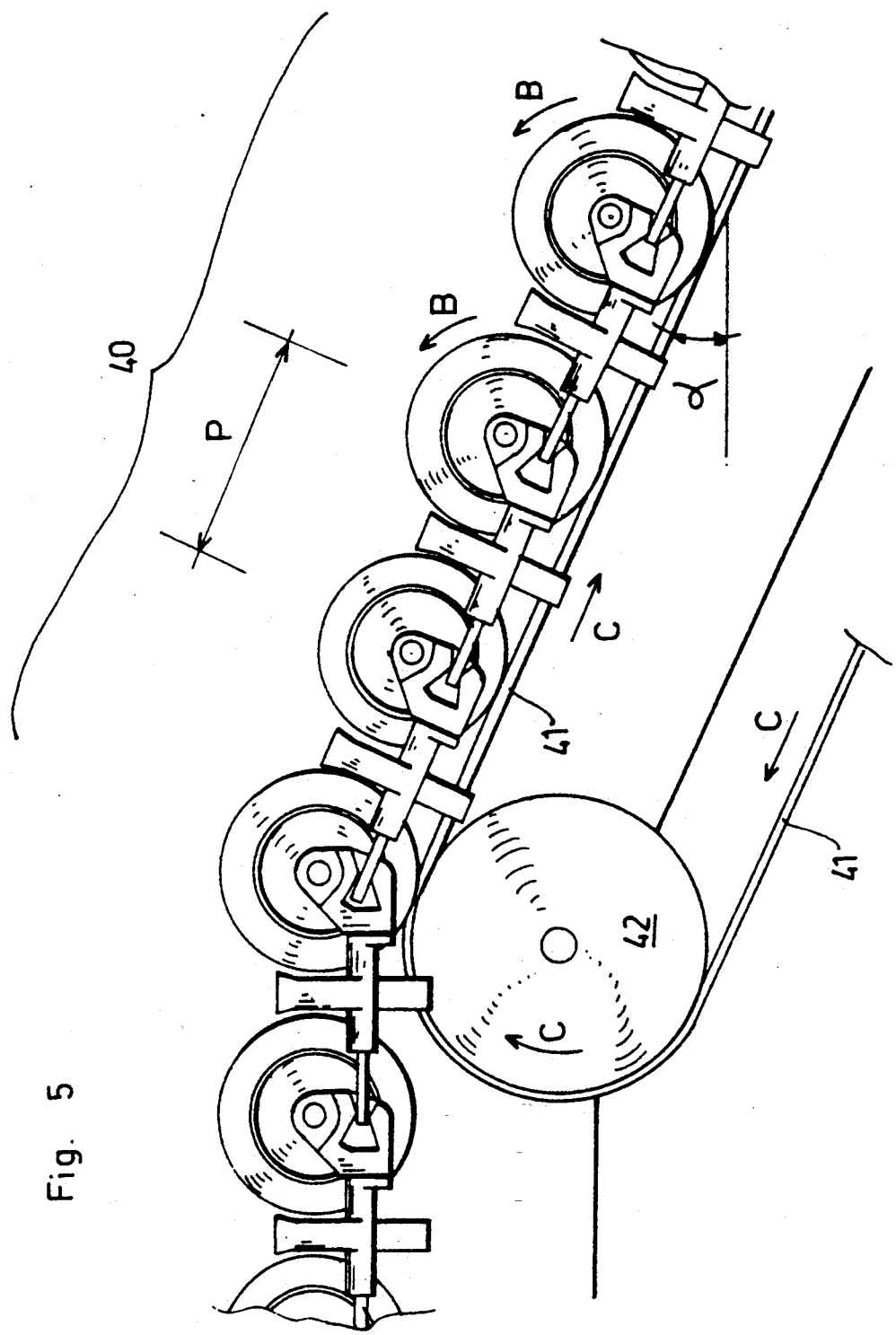

APPARATUS FOR CONVEYING AND SORTING PRODUCE

This invention relates to means for the conveyance of produce, particularly fruit, designed to sort the said produce on the basis of predetermined selection criteria.

The invention relates more particularly to means for discharging this produce.

Such conveyance devices are generally used for the sorting of fruit and are described in particular in patents U.S. Pat. No. 4,569,434, GB 2,143,491 and GB 2,126,356. They consist of a conveyor along which supports for the fruit, monitoring points for determining the weight and colour of the fruit, and fruit discharging zones where the fruit is selectively discharged on the basis of predetermined selection parameters are distributed.

Such means have major advantages but also many disadvantages. In particular the level to which such conveyors can be filled is low. Also the throughput of these conveyors could beneficially be accelerated. Finally, these devices do not incorporate discharge means which are fast, robust and reliable, and non-damaging to the fruit.

The latter disadvantage applicable to discharge means is partly resolved by patent WO 89/08510 (Hiebert) which describes discharge means for fruit which act by raising the fruit and by inclining the fruit support towards the exterior. These discharge means comprise ejectors located between each roller of a plurality of rollers, but have pivot axes secured at only one end. As a result of this, when the fruit is raised, and in accordance with its size, these pivot axes act as cantilevers, which has a tendency to bring about premature wear of the pivot axis and cause the part to break rapidly. Also the conveyance means according to this document has a low efficiency.

This invention is designed to overcome all these disadvantages, and has as its first object the provision of high throughput conveyor means equipped with discharge means which are not damaging to the produce, while being robust and resistant to wear.

Another object of the invention is to provide conveyor means comprising means for the discharge of produce which encourage the latter to drop regardless of its shape.

With this object this invention relates to means for the conveyance of produce, in particular fruit, designed to sort the said produce in relation to predetermined selection criteria. These means are characterised in that they comprise in combination:

a pair of conveyor lines, each designed to carry produce and located on either side of and substantially parallel to an endless drive chain, each line incorporating a plurality of rollers, each supported by an axis A, forming between them a space suitable for the receipt of an item of produce, each of the rollers being located at right angles to the chain and integral with the latter by means of its axis of rotation, and means for discharging the produce comprising:

a plurality of ejectors, each being located between two successive rollers in a conveyor line and beneath the produce located in the corresponding space, and being designed to pivot between a resting position and a discharge position, a plurality of pivot axes, each associated with an ejector and supported by one end of the ejector located opposite the chain, and a plurality of integrating components each mounted so as to rotate freely about the axis of a roller, and designed to connect the plurality of pivot axes with freedom for the pivot axes to move angularly and longitudinally relative to each other.

As a result of these provisions two conveyor lines are produced for a single chain, which doubles the efficiency of the conveyor means in comparison with known means. Furthermore, the symmetrical arrangement of each of the two lines on either side of the chain ensures better balance of the forces present, and hence less wear on the chain.

In addition to this, a set of ejectors whose pivot axes are continually held and guided is provided. This avoids the pivot axes acting as cantilevers, thus reducing the wear on these components.

Furthermore the connection between all the pivot axes of each conveyor line stiffens the conveyor means as a whole, ensuring that it has satisfactory robustness.

Thus conveyor means having a high throughput, having twice the capacity of known means, and provided with non-damaging discharge means which act by raising and inclining the produce, and which also has a structure which is stiffened by the connection between all the pivot axes in a single conveyor line, are provided.

Advantageously, each linking member allows freedom of relative angular and longitudinal movement for the end of the pivot axis housed within it. As a result of this the conveyor means according to the invention may have flat portions and curved portions. The pivot axes may in fact alter their inclination with respect to each other in order to follow curved portions of the endless chain, without breaking, or causing distortions.

Means for discriminating between the produce, adjusted to determine its size and/or weight and/or colour, etc., are located facing each of the conveyor lines.

In accordance with a preferred embodiment of the invention, each linking member is provided with a bore designed to receive the end of the rotation axis of a roller which is distal to the chain, and, on a first side, an orifice designed to receive a first end of a first pivot axis as a force fit and, on a second side, opposite the first, a cavity to house a second end of a second pivot axis with freedom of relative angular and longitudinal movement.

Thus each linking member connects two successive pivot axes and is mounted so that it is free to rotate about the axis of rotation of a roller.

Advantageously each ejector pivots between a resting position in which the supporting arm of the ejector is placed substantially horizontally beneath the produce, and an unloading position in which the supporting arm is inclined outwards away from the conveyor line. These two positions are determined by the concerted action of a spur and a recess.

It will be noted that the cavity in the linking member is open on two of these sides, which allows the unit comprising a pivot axis and the linking member into which it is force fitted to be withdrawn without having to remove all the pivot axes. It is thus possible to act rapidly and easily to replace a broken or worn component.

Advantageously the conveyor means according to the invention comprises means for the feed of produce comprising a controlled inclination zone. This inclination preferably lies between 7° and 16°. By controlling the inclination of this zone in relation to the size of the fruits which are to be sorted, the fruits are uniformly distributed in the spaces provided for the purpose between two rollers. This arrangement makes it possible to fill the conveyor means according to the invention correctly so that there is one fruit per space, and almost no spaces are empty. This improves the throughput of the conveyor means.

Figure 2:
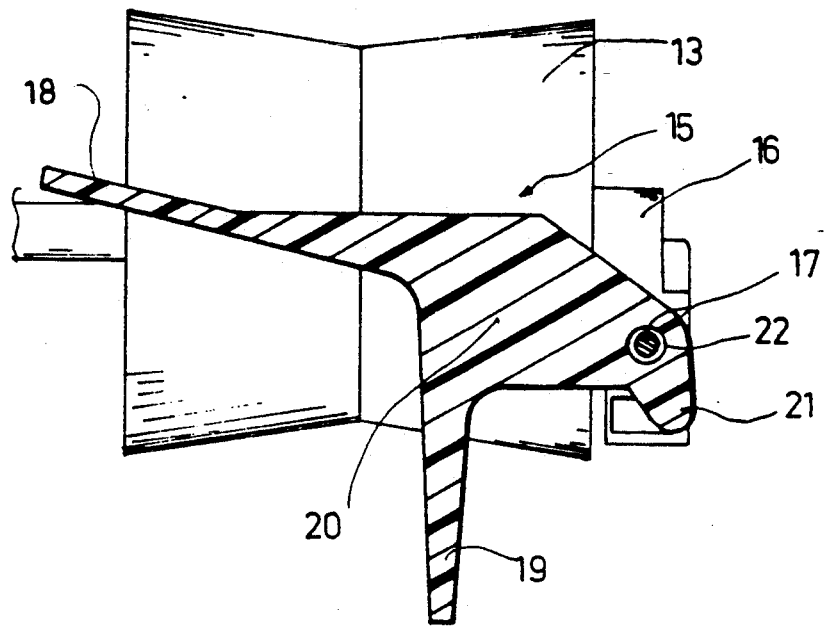
Figure 3:
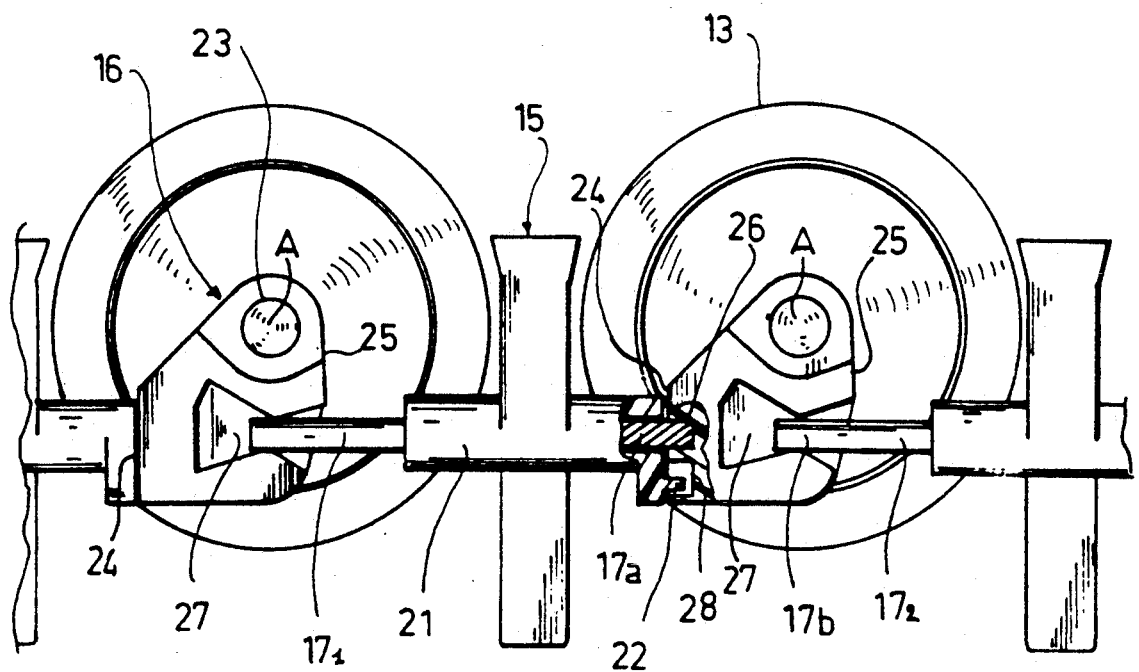
Figure 6:
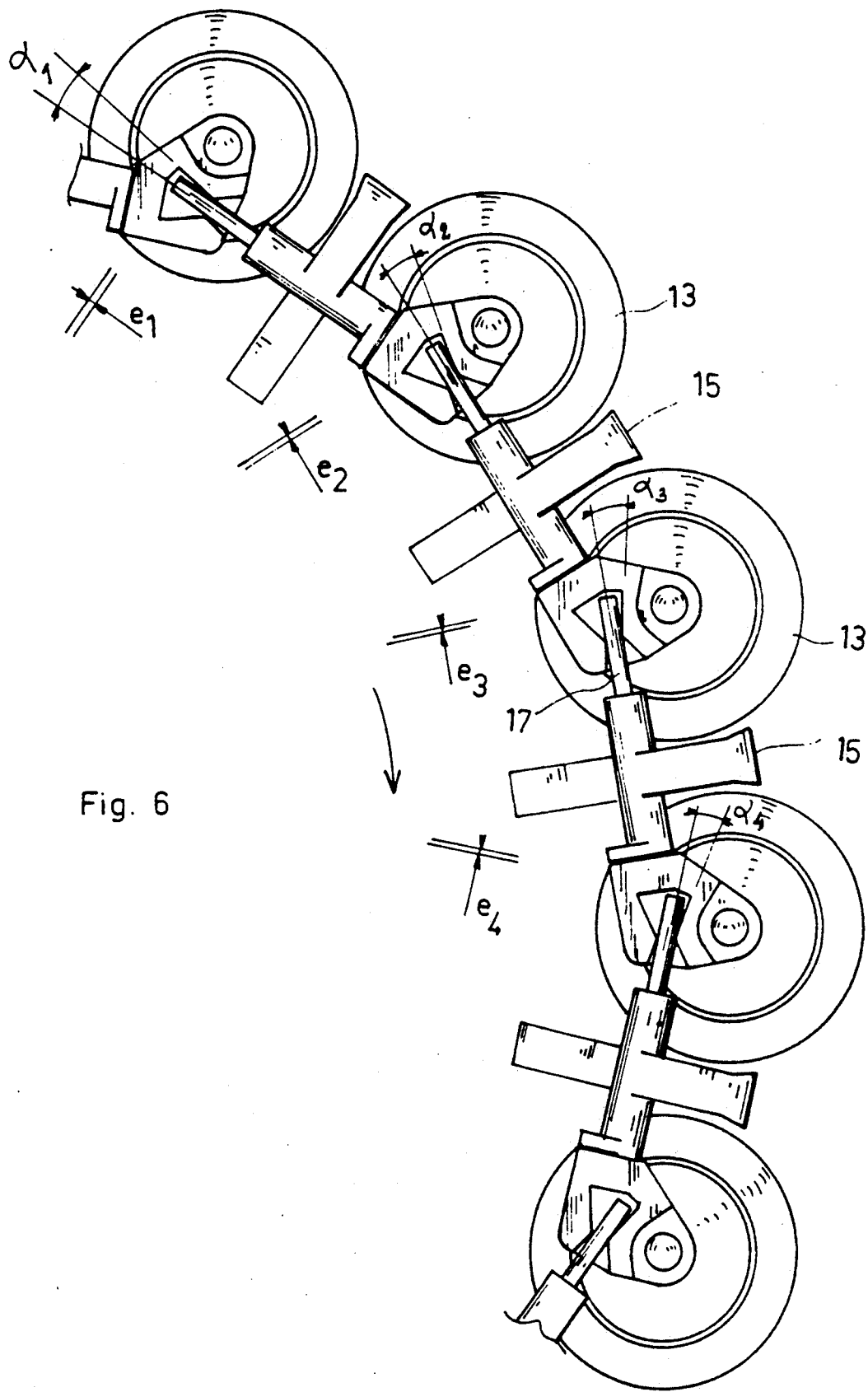

Other objects, features and advantages of this invention will be apparent from the following description by way of a nonrestrictive example with reference to the appended drawings in which:

FIG. 1 is a perspective view of conveyor means according to the invention, in which some rollers have been omitted for clarity in the drawing, FIG. 2 is a longitudinal cross-sectional view of an ejector associated with a roller, FIG. 3 is a front view along the line of the arrow F in FIG. 1 of the discharge means according to the invention, and associated rollers, FIGS. 4a to 4c are longitudinal cross-sectional views in partial cut-away similar to those in FIG. 2 demonstrating the pivoting of the ejector as the fruit is discharged, FIG. 5 is a longitudinal cross-sectional view of the conveyor means according to the invention in the vicinity of the loading area, and FIG. 6 is a longitudinal cross-sectional view of the conveyor means according to the invention showing the angular and longitudinal movement of the pivot axis when the conveyor means is drawn along a curved portion.

In accordance with the embodiment illustrated in FIGS. 1 to 6 the means according to the invention is designed to sort and select fruit.

This conveyor means 10 comprises an endless chain called the drive chain 11, on either side of which are arranged two conveyor lines 12 parallel to the chain. Chain 11 is supported and guided by a frame 14.

Each of the conveyor lines comprises a plurality of identical rollers 13. Each roller 13 has the shape of a double cone and has an external coating of rubber or the like and a core of plastics material.

If the spacing between rollers is indicated by p, the diameter D of each roller will preferably lie between 0.5 p and 1 p and the length L of each roller will preferably lie between 0.7 p and 1.25 p.

Each roller is supported by an axis A about which it is free to rotate. This axis A is integral with drive chain 11 and is located at right angles thereto.

Discharging means (FIGS. 2 and 3) comprising an ejector 15, a linking member 16 and a pivot axis 17 are placed between each roller.

Each ejector (FIG. 2) comprises a supporting arm 18, an ejecting arm 19 and a body 20. Body 20 is provided on the side opposite the two arms 18 and 19 with a bilateral extension 21 (FIG. 3) pierced by a bore 22. This extension 21 has an offset portion provided with a spur 22.

Pivot axis 17 is housed in bore 22 of the ejector.

Each linking member 16 includes a bore 23 designed to receive the end of axis of rotation A of the rollers opposite chain 11. This also has an opening 26 on a first side 24 designed to receive a first end 17a of a first pivot axis 17, as a force fit.

Each linking member also has a cavity 27 on a second side 25 opposite first side 24 which has a hollowed-out portion designed to house a second end 17b of a second pivot axis $17_2$ with freedom of angular and longitudinal movement.

This pivot axis is held in the cavity with some play, to allow the movements indicated above. In addition to this the fact that cavity 27 opens on two sides allows the end of the pivot axis placed in the cavity to be easily removed from it, parallel to itself and without dismantling all the pivot axes.

When it is necessary to replace a pivot axis all that is required is to remove this axis with the linking member in which it is force fitted, and to replace it by a new integral member comprising a pivot axis and a linking member.

Linking member 16 is also provided on its first side 24 with a recess 28 designed to act together with spur 22 of ejector 15 (FIG. 3).

Of course these discharge means are located between each of the rollers so that all the pivot axes 17 in one conveyor line are connected together, with freedom for mutual angular and longitudinal movement.

As may more clearly be seen in FIG. 1, ejection means 29 are fixed to frame 14 supporting drive chain 11.

These ejection means comprise an ejection ramp 30 mounted radially and axially offset on frame 14, and an electromagnet device 31 provided with a pusher 32.

As may more clearly be seen in FIGS. 4a to 4c, the ejection means act together with ejector 15 to cause the latter to pivot.

When a command to select a fruit from the conveyor line is given, the electromagnet, which in the resting condition lies in the position shown in FIG. 4a, i.e. with a pusher 32 at a distance from ejecting arm 19 of the ejector and at a distance from ramp 30, is excited and passes into a position as shown in FIG. 4b.

In this FIG. 4b, pusher 32 of the electromagnet comes into contact with ejecting arm 19 and raises the latter above ramp 30. As a result the ejector is caused to rotate in the direction of arrow R and supporting arm 18 is moved to a position which is inclined by a certain angle α with respect to the horizontal.

As will better be seen in FIG. 1, ramp 30 has a rising portion 33, a horizontal portion 34 and a descending portion 35.

When pusher 32 pushes ejecting arm 19 above the ramp, the latter reaches the ramp via its ascending portion 33. It then follows ramp 30, which acts as a cam for it, over its entire portion 34 which corresponds to the maximum inclination of the ejector illustrated in FIG. 4c.

In this position the ejecting arm is pushed upwards by a maximum amount, the ejector being in the maximum pivot position, and the fruit located in the space between the rollers is raised by the ejector and inclined so that it falls away from the conveyor line. Then the ejecting arm follows descending portion 35 of ramp 30, the pivoting is reversed and the ejector resumes its resting position.

It should be noted that as the ejector pivots in cooperation with pusher 32 of the electromagnet and cam 30, spur 22 of the ejector passes from an extreme position to the right of recess 28 in FIG. 4a to an extreme position to the left of the recess in FIG. 4c.

In concert with recess 28 the spur thus limits the pivoting of the ejector between a resting position in which the ejector's supporting arm is substantially horizontal, and a discharging position in which the ejector's supporting arm is in a highly inclined position. It is also emphasized that selection means (not shown), in particular colour measuring means, (e.g. incorporating video cameras) are associated with each conveyor line so that the size and/or the weight and/or the colour and/or the degree of ripeness of the fruits carried by the conveyor lines are determined remotely. On the basis of this information when the fruit arrives in the selection area, a computer device excites the electromagnet which causes the fruit to fall into a receptacle in which all fruits having the same characteristics as itself are collected. In this way the fruits are sorted on the basis of predetermined selection criteria.

The conveyor means according to the invention is also provided with means for feeding fruits to the conveyor lines (FIG. 5). These feed means form an integral part of the conveyor device according to the invention and comprise a charging zone 40 having a controlled inclination $\alpha$.

This zone 40 also comprises means for causing the rollers which make it up to rotate. These drive means incorporate an endless belt 41, which is caused to rotate by a motor (not shown), and a return pulley 42.

In FIG. 5 belt 41 is driven in the direction of arrows C. This belt passes through the centre and the lower portion of each roller 13 in such a way as it causes these rollers to rotate in the direction of arrows B by friction. Through the rotation of rollers 13 the fruits have a tendency to gain a stable position between each roller in the space provided for them. This ensures that the fruits are satisfactorily distributed, with one being placed in each space.

Furthermore, and advantageously, the inclination of the charging zone can be varied preferably between 7° and 16° so as to adjust to the size of the fruits feeding this charging zone 40. In this way the conveyor lines are optimally filled, with almost every space between two rollers being occupied by one fruit.

As illustrated in FIG. 6, the endless chain in the conveyor means according to the invention turns as a closed circuit, and with it the two conveyor lines which it carries. Because of this, in the curved portions, of which only a part is shown in FIG. 6, the connection between pivot axis 17 is such that each of these can pivot angularly and also longitudinally within cavity 27. It will also be noted that the angles $\alpha_1 \ldots \alpha_4$ vary along the length of the curve and that the clear distance $e_1 \ldots e_4$ at the base of the cavity also varies without constraints, by which means all the conveyor device remains connected without being disturbed by the curved portion.

Thus the conveyor means according to the invention is stiffened through connection of the pivot axis in each conveyor line without this linkage interfering with the manner in which the endless chain follows the curved portions.

Of course this invention is not restricted to the embodiment described above. Thus for example the supporting arm of the ejector may be in the form of a cup. Likewise the produce being sorted may be of any nature and not exclusively fruit.

What is claimed is:

1. Apparatus for conveying and sorting produce according to a predetermined selection criteria comprising (1) a first conveyor line and a second conveyor line which are each constructed and arranged to convey produce and include a plurality of rollers which are each rotatably supported on an individual axis and are in a spaced relationship so as to provide a space capable of holding an item of produce between any two of said plurality of rollers, wherein said first conveyor line and said second conveyor line are positioned substantially parallel to opposite sides of an endless drive chain, and each of said plurality of rollers are positioned at a right angle to said endless drive chain and integrally connected to said endless drive chain by said axis; (2) means for discharging produce from said first conveyor line and said second conveyor line comprising a plurality of ejectors wherein said plurality of ejectors are positioned such that one of said plurality of ejectors is located between two of said plurality of rollers below said space present between any two of said plurality of rollers, and wherein each of said plurality of ejectors is constructed and arranged to pivot between a non-ejecting position and an ejecting position by means of a pivot axis associated with each of said plurality of ejectors; and (3) a plurality of linking members wherein each linking member is rotatably mounted about one of said individual axis of said plurality of rollers, and wherein said plurality of linking members are constructed and arranged to connect together said pivot axis associated with each of said plurality of ejectors while allowing for mutual angular and longitudinal movement between each pivot axis.

2. Apparatus according to claim 1 further comprising a means for examining produce transported by said first conveyor line and said second conveyor line.

3. Apparatus according to claim 1 or claim 2 wherein each of said plurality of linking members are provided with a bore for receiving an end of one of said individual axis of said plurality of rollers, and wherein each of said plurality of linking members has on a first side an orifice for receiving a first end of one of said pivot axis and has on a second side a cavity to receive an end of another one of said pivot axis in a manner which allows for mutual angular and longitudinal movement.

4. Apparatus according to claim 1 or claim 2 wherein each of said plurality of ejectors comprises a body including a support arm, an ejection arm, and a bilateral extension having a bore therein capable of receiving a pivot axis associated with an ejector.

5. Apparatus according to claim 4 wherein said bilateral extension at one end includes an offset portion bearing a spur.

6. Apparatus according to claim 5 wherein each of said plurality of linking members has on a first side a recess with which said spur acts in conjunction so that pivoting of an ejector associated therewith is limited between a non-ejecting position wherein the ejection arm is positioned substantially horizontal to a pivot axis and an ejecting position wherein the ejection arm is at an inclined angle to said pivot axis.

7. Apparatus according to claim 3 wherein the cavity has a hollow portion for receiving a pivot axis so as to allow longitudinal and angular movement of said pivot axis.

8. Apparatus according to claim 3 wherein said another one of said pivot axis in said second side of said cavity can be removed from the cavity without dismantling said pivot axis in said first side of said cavity.

9. Apparatus according to claim 3 wherein the end of said another one of said pivot axis and an associated linking member comprises a single unit.

10. Apparatus according to claim 1 wherein each of said pivot axis associated with one of said plurality of ejectors is positioned substantially at a right angle to one of said individual axis supporting one of said plurality of rollers.

11. Apparatus according to claim 1 further comprising means for feeding produce separately to each of said first conveyor line and said second conveyor line and depositing said produce in said space between any two of said plurality of rollers.

12. Apparatus according to claim 11 wherein said means for feeding forms an integral part of each of said first conveyor line and said second conveyor line and includes a charging zone having a predetermined inclination based on the size of produce being separated and discharged.

13. Apparatus according to claim 12 wherein said inclination of the charging zone is between 7° and 16°.

14. Apparatus according to claim 1 wherein each of said plurality of rollers has a diameter between 0.5 p and 1 p and the length of each of said plurality of rollers is between 0.7 p and 1.25 p, wherein p equals the distance between each of said plurality of rollers.

* * * * *